United States Patent Office 3,080,393
Patented Mar. 5, 1963

3,080,393
PROCESS FOR PREPARING 16α-METHYL-17α-HYDROXY-20-KETO-PREGNANES FROM THE CORRESPONDING 16-DEHYDRO-20-KETO PREGNANES
Gilbert Stork, Leonia, N.J., and Josef E. Herz and Max Wilhelm Wendt, Mexico City, Mexico, assignors, by mesne assignments, to Syntex Corporation, a corporation of Panama
No Drawing. Filed Dec. 1, 1960, Ser. No. 72,843
Claims priority, application Mexico Feb. 4, 1960
7 Claims. (Cl. 260—397.4)

The present invention relates to cyclopentanophenanthrene compounds and to a novel process for the preparation thereof.

More particularly the present invention relates to a novel process to convert 16-dehydro-20-keto-pregnanes to 16α-methyl-17α-hydroxy-20-keto-pregnanes.

The novel process is characterized by the oxygen or air treatment of the magnesium halide enolates or lithium enolates of 16α-methyl-20-keto-pregnanes and may be illustrated by the following partial formulae:

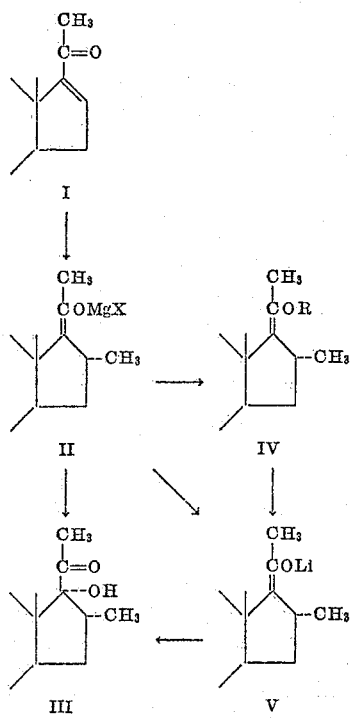

In the above equation, X represents a halogen atom selected from the group comprising chlorine, bromine and iodine and R represents the acyl radical of a hydrocarbon carboxylic acid of less than 12 carbon atoms, preferably the acetyl or the benzoyl group.

In practicing the new process outlined above the 16-dehydro-20-keto-pregnane (I) is reacted with a methyl magnesium halide to form a mixture of the C-20 cis epimer and the C-20 trans epimer of a magnesium halide enolate of the corresponding 16α-methyl-20-keto compound (II) and is then treated with oxygen or air. Subsequent hydrolysis yields the desired 16α-methyl-17α-hydroxy-20-keto compound (III).

Alternatively the magnesium halide enolate (II) is reacted with a hydrocarbon carboxylic acid halide, preferably acetyl chloride or benzoyl chloride to give a mixture of the C-20 cis epimer and the C-20 trans epimer of the corresponding 20-acyloxy compound (IV) in which the acyl group is replaced by lithium (V) by reacting with methyl lithium. The magnesium can also be directly displaced by lithium by reacting the magnesium enolate with methyl lithium. Subsequent treatment with oxygen or air followed by hydrolysis yields the 16α-methyl-17α-hydroxy-20-keto compound (III).

For the conversion of I to II only 1 molecular equivalent of the methyl magnesium halide is necessary and in this case, ester groups of the starting compound remain practically unchanged. When an excess of the methyl magnesium halide is used, such ester groups are converted partially or completely to hydroxy groups. The reaction with the Grignard reagent may be effected with or without a catalyst such as cuprous chloride and in the presence of a conventional solvent such as ether, benzene or tetrahydrofurane, the latter being the solvent of choice. Although temperature and time may fluctuate in wide margins, a short treatment with the chloride, bromide or iodide of methyl-magnesium at room temperature is preferable.

When a current of oxygen or air is passed through the solution of II, obtained as described above, the best results are obtained by introducing pure dry oxygen during 1-3 hours or dry air free of carbon dioxide at low temperatures around 0° C., during 3-5 hours, however time and temperature are not critical. At the end of the treatment with oxygen or air, the mixture is reacted with aqueous ammonium chloride or water to produce the 16α-methyl-17α-hydroxy-20-keto pregnane (III). Ester groups of the starting compound may be saponified or hydroxy groups present in the starting compound can be esterified by conventional methods to give the desired esters thereof with hydrocarbon carboxylic acid anhydrides of less than 12 carbon atoms.

In practicing the process outlined above via the lithium enolate route, the solution of the magnesium halide enolate (II) is reacted with acid halide such as acetyl chloride and benzoyl chloride at room temperature for a period of time of the order of ½ to 3 hours and the resulting C-20 acylate (IV) is then treated with an excess of an ethereal solution of methyl lithium containing an excess of this reagent, preferably containing about 4 molecular equivalents, at room temperature and for 3 hours under an atmosphere of nitrogen. Alternatively the solution of the magnesium halide enolate (II) is reacted directly with the methyl lithium. The thus obtained ethereal solution of the lithium enolate (V) is reacted with oxygen or air as described above; optionally any other suitable solvent such as tetrahydrofurane may be added before effecting the oxygen or air treatment. The solution is then diluted with water and the resulting 16α-methyl-17α-hydroxy-20-keto pregnane (III) is isolated. The reaction with the methyl lithium is concomitant with the conversion of ester groups of the steroid to hydroxy groups which may be conventionally esterified, preferably acetylated.

A most expedient way to convert the 16-dehydro-20-keto pregnanes to the desired 16α-methyl-17α-hydroxy-20-keto-pregnanes is by the introduction of the 17α-hydroxy group in the 16α-methyl-20-keto pregnanes, which are obtained by elaboration of the Grignard addition products produced from said starting 16-dehydro-20-keto-pregnanes (compare Marker et al., J. Am. Chem. Soc., 64, 1280 (1949)). However, the commonly used methods for 17α-hydroxylation, such as the well known procedure of Gallagher et al. (J.A.C.S., 71, 3262 (1949)), give only unsatisfactory results in the presence of the 16-methyl group. A recent modification of the Gallagher process involves the peracid-epoxidation of IV (R=acetyl) and the subsequent alkali treatment of Heusler et al. (Helv. Ch. Acta XLII, 2043 (1959)). This modification has the disadvantage that no other double bonds susceptible to the peracid treatment can be present since such double bonds must first be saturated. These double bonds are valuable as they are useful for further transformations and their loss in the previous modification is a disadvantage. The new process is therefore not only a short route to 16α-methyl-17α-hydroxy-20-keto-pregnane derivatives, important intermediates for the elaboration of many hormones, but also of great importance for the industrial preparation of said hormones.

The starting $\Delta^{16}$-20-keto pregnane derivatives may be saturated in their nucleus or they may have in addition to the C–16,17 double bond one or more additional carbon-to-carbon bonds, the A/B ring fission may be cis or trans, and there may be a hydroxy or an acyloxy group, preferably an acetoxy group, at C–3 (α or β).

One of the most commonly used starting materials in partial synthesis of steroid hormones is $\Delta^{5,16}$-pregnadiene-3β-ol-20-one, the product of the side-chain degradation of diosgenin. As illustrated in the following examples, 16α-methyl-$\Delta^5$-pregnen-3β,17α-diol-20-one or its 3-acetate is easily obtained therefrom. The 3-acetate of 16α-methyl-$\Delta^5$-pregnen-3β,17α-diol-20-one may be converted to the potent progrestational agent 16α-methyl-17α-acetoxy progesterone by acetylation at C–17, subsequent hydrolysis of the C–3 acetoxy group and, finally, by Oppenauer oxidation as described by Ringold and Djerassi in copending U.S. patent application Serial No. 773,830, filed November 14, 1958.

The new process can also be applied to the conversion of $\Delta^{5,9(11),16}$-pregnatrien-3β-ol-20-one acetate, obtained from botogenin, to 16α-methyl-$\Delta^{5,9(11)}$-pregnadien-3β,17α-diol-20-one. The latter compound is converted to 16α-methyl-9α-fluoro-hydrocortisone by first oxidizing the 3-hydroxy group to the keto group by treatment with 8 N chromic acid, followed by acidic rearrangement of the double bond at C–5,6 to the position C–4,5, subsequent introduction of a fluoro group at C–9α by following the procedure of Fried et al., J. Am. Chem. Soc. 79, 1130 (1957) to form 16α-methyl-9α-fluoro-$\Delta^4$-pregnene-11β,17α-diol-3,20-dione and finally 21-acetoxylation (Ringold and Stork, J. Am. Chem. Soc. 80, 250 (1958)).

By the novel process of the present invention $\Delta^{16}$-pregnen-3α-ol-11,20-dione acetate (Nes et al., J. Am. Chem. Soc., 73, 4765 (1951)) is converted into 16α-methyl-pregnane-3α,17α-diol-11,20-dione which is then transformed to 16α-methyl-prednisone as reported by Oliveto et al. (J. Am. Chem. Soc. 80, 4428 (1958)).

By the new process the tigogenin degradation product $\Delta^{16}$-allopregnen-3β-ol-20-one is converted into 16α-methyl-allopregnane-3β,17α-diol-20-one, which serves as the intermediate for the preparation of 16α-methyl-9α-fluoro-prednisolone by the procedure of Oliveto et al., (J. Am. Chem. Soc. 80, 4431 (1958)).

In a similar manner $\Delta^{16}$-allopregnen-3β-ol-11,20-dione acetate and $\Delta^{16}$-allopregnen-3β,11α-diol-20-one diacetate described by Djerassi et al., in J. Am. Chem. Soc. 74, 3634 (1952) are converted into 16α-methyl-allopregnane-3β,17α-diol-11,20-dione and 16α-methyl-allopregnane-3β,11α,17α-triol-20-one. Similarly, $\Delta^{5,16}$-pregnadiene-3β,11α-diol-20-one, described by Halpern et al., in J. Am. Chem. Soc. 81, 439 (1959)), is converted into 16α-methyl-$\Delta^5$-pregnene-3β,11α,17α-triol-20-one-3,11-diacetate by the novel process of the present invention which in turn is converted into 16α-methyl cortisone by first saponifying the ester groups, oxidizing with 8 N chromic acid, shifting the double bond to C–4,5 and introducing an acetoxy group at C–21 by methods well known to those skilled in the art.

The following examples serve to illustrate but are not intended to limit the scope of the invention.

*Example I*

In a three-necked round bottom flask provided with a thermometer, gas-inlet tube and a mechanical stirrer, 15 ml. of 3 N methyl magnesium bromide in tetrahydrofurane was cooled to 10° C. 600 mg. of cuprous chloride and then 6 g. of $\Delta^{5,16}$-pregnadien-3β-ol-20-one acetate dissolved in 50 ml. of tetrahydrofurane were added, stirring constantly during 15 minutes at an internal temperature of about 10° C. The mixture was stirred between 20–30° C. for one hour, then cooled to 0° C.; a current of oxygen was passed through the reaction mixture during 1 hour. At the end of this period the mixture was poured into 150 ml. of aqueous 10% ammonium chloride, extracted with ether, and the extract was washed with water, dried over anhydrous sodium sulfate and evaporated to dryness. The residue was treated with 10 ml. of acetic anhydride and 20 ml. of pyridine at room temperature overnight and then poured into ice-water. Aqueous sodium bicarbonate and water was added and the solid was collected by filtration, washed with water, dried and crystallized from acetone-hexane. The 16α-methyl-$\Delta^5$-pregnene-3β,17α-diol-20-one 3-acetate was obtained.

The mother liquids were chromatographed on neutral alumina; benzene-elutions yielded an additional yield of 16α-methyl-$\Delta^5$-pregnene-3β,17α-diol-20-one - 3 - acetate. Further elutions with mixtures of benzene and methylene chloride gave a solid which crystallized from methanol; M.P. 223–225° C.; [α]$_D$—120° (chloroform). This compound is considered to be the result of a ring D-homo rearrangement.

*Example II*

A repetition of the procedure of Example I, but using methyl magnesium chloride instead of the bromide gave essentially the same results as obtained in accordance with that example.

*Example III*

A repetition of the procedure of Example I, but using methyl magnesium iodide instead of the bromide gave essentially the same results as obtained in accordance with Example I.

*Example IV*

The procedures of Examples I through III were repeated but only 1.0 molecular equivalent of the Grignard reagent was employed. In this case the acetylation step could be omitted since with the use of only 1 molecular equivalent of the methyl magnesium halide, the 3-acetoxy group remained essentially unchanged.

*Example V*

By repeating the procedures of Examples I through IV but omitting the use of the cuprous chloride there were obtained the same results in accordance with such examples.

*Example VI*

By following the procedure of Example V except that the reaction mixture obtained after the treatment with oxygen was poured into dilute aqueous hydrochloric acid instead of into the aqueous ammonium crloride solution, there were obtained the same results in accordance with such example.

*Example VII*

In accordance with the procedures described in the Examples I through VI, $\Delta^{5,16}$-pregnadien-3β-ol-20-one acetate was treated with the respective methyl magnesium halide, the resulting suspension reacted with oxygen, poured into aqueous ammonium chloride or dilute acid, the product was ether-extracted and the solvent evaporated. The crude material was treated with 1% methanolic potassium hydroxide solution, using 50 ml. of said solution for 1 g. of steroid at 15° C., under nitrogen, and stirring for 2 hours; the alkaline solution was then acidified by addition of acetic acid, concentrated to small volume under reduced pressure and the product precipitated by addition of water. The solid was collected by filtration, water-washed and air-dried; crystallization from acetone-hexane yielded free 16α-methyl-$\Delta^5$-pregnen-3β,17α-diol-20-one.

*Example VIII*

The procedures of Examples I through VI were repeated starting with free $\Delta^{5,16}$-pregnadien-3β-ol-20-one and omitting the acetylation step. Thus 16α-methyl-$\Delta^5$-pregnen-3β,17α-diol-20-one was obtained.

Example IX

The procedures described in the foregoing examples were repeated but using a current of air instead of oxygen. The suspension of the Grignard addition product was treated with a current of dry air, previously washed by passing through aqueous barium hydroxide solution; the air current was passed at 0° and for 3 hours. The products of the air-treatment were elaborated exactly as described in the case of the reaction with oxygen; and essentially identical final results were obtained.

Example X

The procedures described in the foregoing examples were repeated, but extending the reaction time to about 5 hours when air was employed and/or varying the temperature in the oxidation step between —20 and 30° C. The final results were essentially the same as obtained following the procedures of said examples.

Example XI

In accordance to the method described by Heusler et al. (loc. cit.) a mixture of the C-20 cis epimer and the C-20-trans epimer of 16α-methyl-3β,20-diacetoxy-$\Delta^{5,17(20)}$-pregnadiene was prepared. By conventional methods, from 4 g. of magnesium, 11 ml. of methyl iodide and 250 ml. of ether, a Grignard solution was prepared; 500 ml. of tetrahydrofurane was added while stirring, and 350 ml. of the solvent distilled off. The suspension was cooled to 20°, and in a steady stream of nitrogen, and while stirring, 1 g. of cuprous chloride and then a solution of 35 g. of $\Delta^{5,16}$-pregnadien-3β-ol-20-one acetate in 200 ml. of tetrahydrofurane was added at 20° C. and in the course of 3 minutes. Stirring was continued for 30 minutes at room temperature; the mixture was then treated with 11 ml. of acetyl chloride dissolved in 100 ml. of tetrahydrofurane. After addition of the acetyl chloride, stirring was continued for 30 additional minutes, 500 ml. of ether and then 300 ml. of aqueous ammonium chloride solution were added, the organic layer was separated, washed with sodium thiosulfate and again with aqueous ammonium chloride solution, dried over anhydrous magnesium sulfate and evaporated, leaving an amphorous residue which was treated with 80 ml. of pentane at —3° C. for 90 hours. The crystalline product was collected by filtration and dried. It consisted of the mixture of the 16α-methyl-3β,20-diacetoxy-$\Delta^{5,17(20)}$-pregnadienes epimeric at C-20, which was used in the next step without purification.

The foregoing mixture was treated with an ethereal solution of methyl lithium containing 4 molecular equivalents of this reagent. The methyl lithium solution was prepared by refluxing methyl iodide with a slight excess of lithium in ether and decanting the clear solution from the settled lithium iodide. The mixture of the steroid and the ethereal methyl lithium solution was stirred in a nitrogen atmosphere at room temperature for 3 hours, then it was chilled to 0° C. and treated with an oxygen stream as described in Example I, at 0° and for 1 hour. The product was elaborated exactly as described in said example including the acetylation step. There was thus finally obtained 16α-methyl-$\Delta^5$-pregnene-3β,17α-diol-20-one of identical properties as the product prepared in accordance to Example I.

Example XII

The treatment with acetyl chloride as described in the foregoing example was applied to the reaction mixtures containing the Grignard addition products produced in accordance with the procedures of Examples I through VII, yielding the C-20-epimeric mixture of 16α-methyl-3β,20-diacetoxy-$\Delta^{5,17(20)}$-pregnadiene, of identical properties with the intermediate obtained by the method reported in Example XI.

Example XIII

The suspension of the Grignard addition products used in the procedures of Examples XI and XII for the reaction with acetyl chloride were treated in analogous manner with benzoyl chloride, thus obtaining the corresponding intermediates having at C-20 the benzoxy group instead of the acetoxy group. The subsequent reaction with methyl lithium resulted in the respective C-20 epimeric lithium enolates which were submitted to the treatment with oxygen and then to the elaboration including final acetylation as described in Example XI. Thus also 16α-methyl-$\Delta^5$-pregnene-3β,17α-diol-20-one acetate was produced.

Example XIV

The procedures of Examples XI through XIII were repeated but the final acetylation step was omitted. Thus free 16α-methyl-$\Delta^5$-pregnen-3β, 17α-diol-20-one was produced.

Example V

The procedures of Examples XI through XIV were repeated using a current of air instead of oxygen, as described in Examples IX and X, yielding finally 16α-methyl-$\Delta^5$-pregnen-3β, 17α-diol-20-one or its 3-acetate, respectively.

Example XVI

By following the methods described in the foregoing examples, the 16-dehydro-20-keto-pregnanes listed under A were converted into the products listed under B:

| A | B |
|---|---|
| $\Delta^{5, 9(11), 16}$-pregnatrien-3β-ol-20-one acetate. | 16α-methyl-$\Delta^{5, 9, (11)}$-pregnadiene-3β, 17α-diol-20-one. |
| $\Delta^{5, 16}$-pregnadiene-3β, 11α-diol-20-one. | 16α-methyl-$\Delta^5$-pregnene-3β, 11α, 17,-triol-20-one-3, 11-diacetate. |
| $\Delta^{16}$-pregnen-3α-ol-11, 20-dione acetate. | 16α-methyl-pregnane-3α, 17α-diol-11, 20-dione. |
| $\Delta^{16}$-allopregnen-3β-ol-20-one | 16α-methyl-allopregnane-3β, 17α-diol-20-one. |
| $\Delta^{16}$-allopregnen-3β-ol-11, 20-dione acetate. | 16α-methyl-allopregnane-3β, 17α-diol-11, 20-dione. |
| $\Delta^{16}$-allopregnen-3β, 11α-diol-20-one diacetate. | 16α-methyl-allopregnane-3β, 11α, 17α-triol-20-one. |

We claim:

1. A process for preparing a 3-oxygenated-16α-methyl-17α-hydroxy-20-keto pregnane derivative which comprises reacting a compound selected from the group, consisting of a 3-OR'-$\Delta^{16}$-20-keto-pregnene, a 3-OR'-$\Delta^{16}$-20-keto-allopregnene, a 3-OR'-$\Delta^{5,16}$-20-keto-pregnadiene and a 3-OR'-$\Delta^{5,9(11),16}$-20-keto-pregnatriene wherein R' is selected from the group consisting of hydrogen and a hydrocarbon carboxylic acyl group of less than 12 carbon atoms, with a methyl magnesium halide selected from the group consisting of methyl magnesium bromide, methyl magnesium iodide and methyl magnesium chloride, oxidizing the thus formed 16α-methyl-$\Delta^{17(20)}$-enolate derivative with an oxidizing agent selected from the group consisting of oxygen and air and thereafter hydrolyzing to form the 16α-methyl-17α-hydroxy-20-keto pregnane derivative.

2. A process for preparing a 3-oxygenated-16α-methyl-17α-hydroxy-20-keto pregnane derivative which comprises reacing a compound selected from the group consisting of a 3-OR'-$\Delta^{16}$-20-keto pregnene, a 3-OR'-$\Delta^{16}$-20-keto-allopregnene, a 3-OR'-$^{5,16}$-20-keto-pregnadiene and a 3-OR'-$\Delta^{5,9(11),16}$-20-keto pregnatriene wherein R' is selected from the group consisting of hydrogen and a hydrocarbon carboxylic acyl group of less than 12 carbon atoms, with a methyl magnesium halide selected from the group consisting of methyl magnesium bromide, methyl magnesium iodide and methyl magnesium chloride, acylating the thus formed 16α-methyl-$\Delta^{17(20)}$-enolate derivative with a hydrocarbon carboxylic acid of less than 12 carbon atoms, reacting the thus formed 16α-methyl-Δ$^{17(20)}$-enol acylate with an alkyl lithium and thereafter oxidizing the thus formed 16α-methyl-Δ$^{17(20)}$-lithium enolate with an oxidizing agent selected from the group consisting of oxygen and air and then hydrolyzing to form the 16α-methyl-17α-hydroxy-20-keto-pregnane derivative.

3. A process for preparing 3-oxygenated-16α-methyl-17α-hydroxy-20-keto-pregnane which comprises oxidizing a compound selected from the group consisting of an alkali metal salt of the Δ$^{17(20)}$-enolate of a 3-OR'-16α-methyl-20-keto pregnane and an alkaline metal salt of the Δ$^{17(20)}$-enolate of a 16α-methyl-20-keto-pregnane wherein R' is selected from the group consisting of hydrogen and a hydrocarbon carboxylic acyl group of less than 12 carbon atoms, with an oxidizing agent selected from the group consisting of oxygen and air and thereafter hydrolyzing to form the 16α-methyl-17α-hydroxy-20-keto-pregnane derivatives.

4. The process of claim 3 wherein the alkaline metal salt of the enolate is a compound of the following formula:

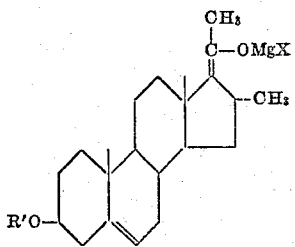

wherein R' is selected from the group consisting of hydrogen and a hydrocarbon carboxylic acyl group of less than 12 carbon atoms and X is selected from the group consisting of chlorine, bromine and iodine.

5. The process of claim 3 wherein the alkali metal salt of the enolate is a compound of the following formula:

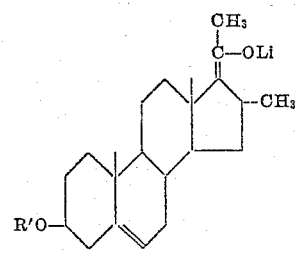

wherein R' is selected from the group consisting of hydrogen and a hydrocarbon carboxylic acyl group of less than 12 carbon atoms.

6. The process of claim 3 wherein the oxidation is effected with dry oxygen at 0° C. for a period of time in the order of one to three hours.

7. The process of claim 3 wherein the oxidation is effected with dry air free from carbon dioxide at 0° C. for a period of time in the order of 3 to 5 hours.

References Cited in the file of this patent

UNITED STATES PATENTS 2,944,070     Kollonitsch et al     June 5, 1960